United States Patent [19]
Kojima et al.

[11] Patent Number: 5,272,581
[45] Date of Patent: Dec. 21, 1993

[54] DISK-TYPE RECORDING MEDIUM AND STORAGE APPARATUS

[75] Inventors: Shyuichi Kojima; Hiroyuki Suzuki; Akira Kato; Keigo Iechika, all of Odawara; Mikio Takada, Kanagawa; Masaki Ohura, Odawara, all of Japan

[73] Assignee: Hitachi, Ltd., Tokyo, Japan

[21] Appl. No.: 760,073

[22] Filed: Sep. 13, 1991

[30] Foreign Application Priority Data

Sep. 14, 1990 [JP] Japan .................. 2-244180

[51] Int. Cl.$^5$ ............................. G11B 5/016
[52] U.S. Cl. ................... 360/98.01; 360/98.02; 360/98.08
[58] Field of Search ............ 360/98.01, 97.01, 97.03, 360/98.02, 98.03, 98.07, 98.08, 99.01, 99.04, 99.05, 99.08, 99.12, 135

[56] References Cited

U.S. PATENT DOCUMENTS

| | | |
|---|---|---|
| 3,537,083 | 10/1970 | Voth .................................. 360/135 |
| 4,652,499 | 3/1987 | Howard . |
| 5,016,128 | 5/1991 | DiIorio et al. .................. 360/97.01 |

FOREIGN PATENT DOCUMENTS

| | | | |
|---|---|---|---|
| 0200582 | 9/1987 | Japan ................................ 360/135 |
| 0146176 | 6/1989 | Japan ................................ 360/135 |

OTHER PUBLICATIONS

"Glass Substrate Disk", *IBM Technical Disclosure Bulletin*, vol. 12, No. 6, Nov. 1969, p. 766, B. Brezoczky.

Primary Examiner—David P. Porta
Attorney, Agent, or Firm—Antonelli, Terry, Stout & Kraus

[57] ABSTRACT

A disk-type recording medium having a circular substrate on which a recording layer is formed does not include any through hole formed in the center of rotation. Since no through hole is formed, it is possible to improve the reliability of the medium with regard to its strength, and to reduce the thickness of the substrate. Further, it is possible to render the thickness of the recording coating uniform.

7 Claims, 5 Drawing Sheets

DISK-TYPE RECORDING MEDIUM AND STORAGE APPARATUS

BACKGROUND OF THE INVENTION

1. Field of the Invention

The present invention relates to a disk-type recording medium which, while rotated, allows data to be recorded thereon and/or reproduced therefrom by a head, and also relates to a storage apparatus incorporating such a recording medium.

2. Description of the Related Art

A greater part of conventional hard-type magnetic recording media has been the type comprising a magnetic coating in the form of magnetic layers on either surface of a circular Al substrate. Such magnetic recording media have various outer diameters such as 14", 10.5", 9.5", 8", 5.25", 3.5" and 2.5". Their thickness is of the order of several mm, typically about 2 mm.

On the other hand, a magnetic recording apparatus has an arrangement for allowing several magnetic recording media to be stacked one above another with a single rotary shaft passing through the media so that a large area for writing magnetic recording information is assured, and the recorded information capacity of the apparatus is increased. Accordingly, in order that a magnetic recording apparatus may allow several magnetic recording media to be precisely stacked and easily mounted in said relationship with the rotary shaft, a magnetic recording medium includes a substrate having a through hole formed therein.

In, for example, U.S. Pat. No. 4,652,499 a magnetic recording medium is proposed which includes a substrate composed of an Si wafer of the same type as those for semiconductor devices. Also known are magnetic recording media in which glass, in particular, chemically strengthened glass, is used as the substrate material.

A disadvantage of the above-described construction resides in the fact that, when glass or an Si wafer is used as the material for forming the substrate of a recording medium, the strength of the medium may be greatly deteriorated by the formation of the through hole in the substrate. Specifically, cracks tend to be generated in the inner peripheral edge around the through hole when the substrate is being subjected to the through hole forming operation or when the recording medium is being fitted onto a spindle. During the rotation of the recording medium at a high speed, the cracks may grow, finally leading to the breakage of the recording medium. Thus, a problem arises in which the reliability of the recording medium with regard to its strength is low.

Another problem is that, in order to allow the strength of the recording medium to be maintained above a certain value, the thickness of the substrate cannot be reduced below a certain dimension.

A further problem is that, when each of the magnetic layers is being formed by certain vacuum thin layer forming art, such as a sputtering method, the existence of the through hole causes a part of the deposition particles ejected from the side of one of the substrate surfaces to be deposited on the other surface, thereby causing differences in the thickness of the formed layers between the vicinity of the through hole and the vicinity of the outer periphery of the substrate.

SUMMARY OF THE INVENTION

A primary object of the present invention is to provide a disk-type recording medium and a magnetic disk that enables the strength and reliability to be improved, the thickness of the substrate to be reduced, and the thickness of the layers formed on the substrate to uniform.

Other objects of the present invention are to provide a storage apparatus incorporating one or more disk-type recording media capable of achieving the above object, and to provide a recording media aligning jig for aligning a plurality of such disk-type recording media in such a manner that their respective centers of rotation each coincide with the same straight line.

In order to achieve the primary object, the present invention provides a disk-type recording medium characterized in that no through hole is formed in a circular substrate of the medium.

When the disk-type recording medium is a magnetic recording medium, the circular substrate is preferably formed of glass or a ceramic material such as an Si wafer.

In order to achieve the primary object, the present invention provides another disk-type recording medium characterized in that no through hole is formed in a circular substrate of the medium with a protruded and/or recessed structure (consisting of protrusions or recesses or a protrusion and a recess) being formed on or in the substrate at or in the vicinity of the center of rotation of the substrate.

The recessed and/or protruded structure may be formed in or on various layers formed on the circular substrate. A plurality of recessed and/or protruded structures may be formed in or on the medium at positions substantially equidistant from the center of rotation of the substrate.

The present invention provides a storage apparatus which comprises at least one disk-type recording medium having a circular substrate on which a recording coating is formed, with the circular substrate having no through hole formed therein. Recording medium holding means hold the at least one disk-shaped recording medium in such a manner that the at least one disk-shaped recording medium is rotatable about an imaginary axis of rotation common thereto. Driving means drive and rotate the at least one disk-shaped recording medium, and head means are provided for recording data on and/or reproducing data from the at least one disk-shaped recording medium.

Here, the recording medium holding means may be realized by pressing the at least one disk-shaped recording medium from the direction of the axis of rotation of the medium with the axis of rotation positioned in the center.

In order to achieve the third object, the present invention provides a recording media aligning jig for aligning a plurality of disk-shaped recording media having the same diameter and having no through hole at the position of the axis of rotation of each medium, with the jig aligning the media in such a manner that the respective axes of rotation of the plurality of disk-shaped media each coincide with the same straight line. The jig comprises a recording media reference body having a first reference surface formed linearly in a direction parallel to the axis of rotation of the plurality of disk-shaped recording media, with the first reference surface being capable of contacting the individual outer peripheral edges of the plurality of disk-shaped recording media. A spacer reference body has at least one second reference surface formed linearly in a direction parallel to the axis of rotation of at least one spacer for maintaining the space between adjacent ones of the plurality of disk-shaped recording media, with the at least one second reference surface being capable of contacting the outer peripheral edge of the at least one spacer. A pressing mechanism presses the plurality of disk-shaped recording media and the at least one spacer in such a manner as to bring the media and the at least one spacer into contact with the mated reference surfaces.

A disk-type recording medium that has no through hole for assuring the center of rotation of the medium formed therein is advantageous in that, when compared with a disk-type recording medium having such a through hole, breakage of the recording medium during its high-speed rotation occurs only with difficulty so that the mechanical reliability of the medium is improved.

In general, when a crack or cracks have been generated in the inner periphery of the through hole, breakage tends to occur during high-speed rotation of the disk due to the propagation of stress. This phenomenon often takes place when the substrate material is a relatively hard material such as glass or an Si wafer. When cracks of the above-described type are generated, they are very small, and it is difficult to find them optically. Therefore, in an inspection process, a product having such cracks cannot be easily rejected as a defective product. The breakage of a disk due to crack generation can be easily prevented by not forming a through hole in the substrate.

The substrate is subjected to various types of stress during the manufacturing processes. For example, in a substrate machining process, the substrate is subjected to machining stress while the portion at which the substrate is supported is subjected to a supporting pressure. In a sputtering (layer forming) process, the substrate is subjected to thermal stress. Further, during the process of mounting the medium onto a storage apparatus, the substrate is subjected to a fixing pressure for fixing the medium to the spindle. It is important that the substrate be free from deformation or breakage when it is subjected to such stress. The overall waviness of the substrate deteriorates the floating characteristic of the magnetic head, and it also increases the tangential force during the contact/start/stop of the magnetic head, thus causing problems with regard to reliability. The absence of a through hole in the substrate renders the substrate hardly vulnerable to deformation due to an external force, thereby making it possible to easily prepare a substrate having a low level of surface waviness and having a high level of precision. Further, since the substrate is capable of withstanding an external force, the thickness of the substrate can be easily reduced.

In general, a magnetic storage apparatus incorporates a plurality of (about several to ten) magnetic recording media. When the thickness of the substrate of each of such magnetic recording media is reduced, a substantial reduction in the external dimension of the storage apparatus is possible. For example, when a recording medium according to the present invention achieves a reduction in the substrate thickness from 2 mm to 1 mm, a storage apparatus incorporating ten such recording media can have its external diemension reduced by 10 mm.

Another disadvantage of the formation of a through hole substantially centrally of a substrate is that, in a sputtering layer-forming process, a part of the substance being supplied from the side of one of the substrate surfaces to be deposited thereon escapes through the hole to the other surface. This inevitably results in that the thickness of the formed layers being increased in the vicinity of the inner periphery of the through hole. The increase in the layer thickness varies depending on the sputtering layer-forming forming conditions and, for example, when the increase is great, it may result in a 10% or greater increase from the average layer thickness. The absence of a through hole formed in the substrate eliminates the possibility of a part of the deposition substance escaping from one surface to the other, thereby making it possible to prevent an increase in the layer thickness, hence, to control the layer thickness with a higher level of precision.

The aligning of the respective centers of rotation of such recording media can be easily accomplished by using, for example a jig including a recording medium reference body having a reference surface which is formed linearly in a direction parallel to the axis of rotation of a plurality of recording media, and which is capable of contacting the individual outer peripheral edges of the plurality of recording media.

The aligning of the rotational centers can also be easily accomplished by using the combination of recording media each having a recessed and/or protruded structure formed at or in the vicinity of the center of rotation of the medium, and at least one spacer having a protruded and/or recessed structure capable of fitting with the recessed and/or protruded structure of the recording medium.

DESCRIPTION OF THE PREFERRED EMBODIMENTS

Figure 1:
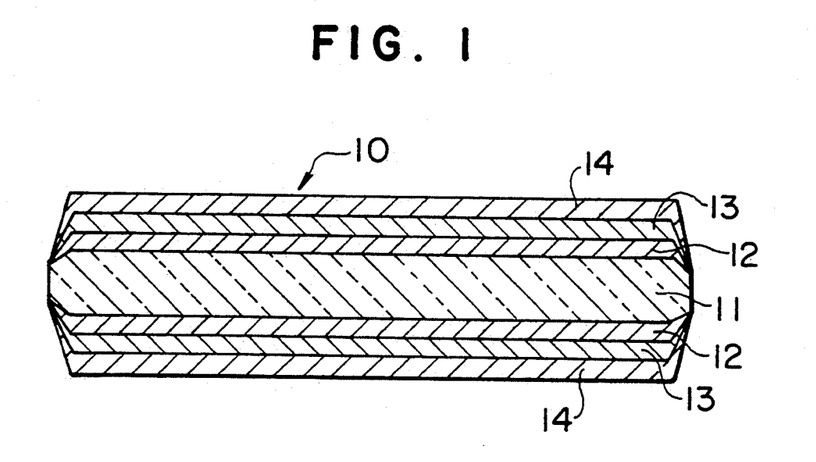
FIG. 1 is a cross sectional view of a magnetic disk.

As shown in FIG. 1, a magnetic disk 10 includes a flat non-magnetic substrate 11 of a chemically strengthened glass. A base layer 12, a magnetic layer 13 and a protective layer 14 are subsequently formed on each surface of the substrate 11. The magnetic disk 10 has no through hole for fixing the disk 10 in place in a magnetic storage apparatus. The materials used to form the base layers 12, the magnetic layers 13 and the protective layers 14 are Cr, Co-Ni-Cr and C, respectively. The layers 12, 13 and 14 are formed by a DC magnetron sputtering method, and have a thickness of 250 nm, 50 nm, and 40 nm, respectively.

The non-magnetic substrate 11 has an outer diameter of 130 mm and a thickness of 1.5 mm, and the outer peripheral edge of the substrate 11 is chamfered. In order to perform a sputtering layer-forming process, the non-magnetic substrate is held by a holder (not shown). In this process, the base layers 12, the magnetic layers 13 and the protective layers 14 are continuously formed while the holder is being conveyed.

When the magnetic disk 10 is completed in this manner, the magnetic disk 10 is subjected to magnetic recording check employing a magnetic recording tester. It has been experimentally determined that there was no difference in operation between the disk 10 and a disk having a through hole. Thus, it has been confirmed that the magnetic disk 10 is operable without problems.

Figure 6:
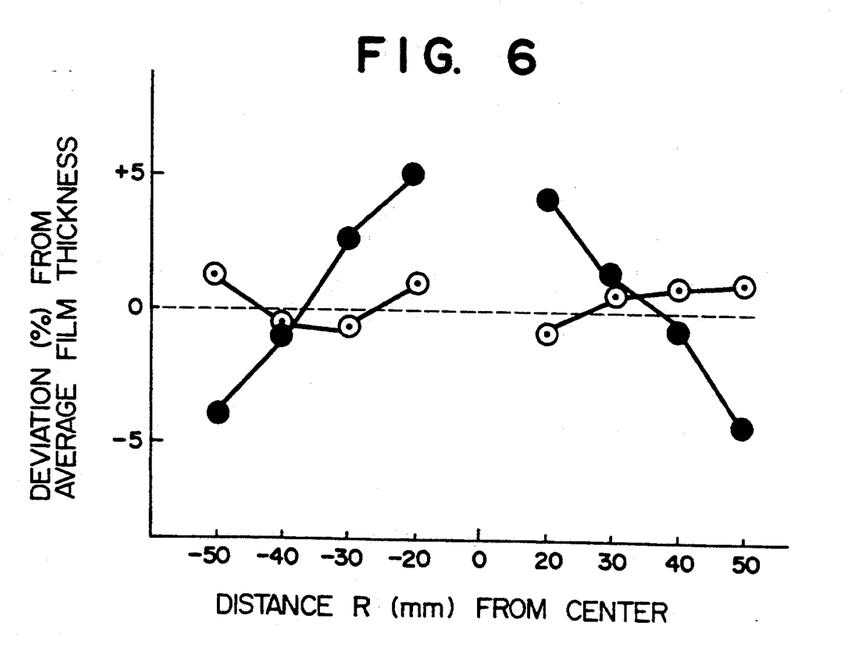
FIG. 6 is a graphical illustration of the distribution of film thickness.

FIG. 6 shows certain data on the distribution of layer thickness obtained by the following experiment performed with respect to the case where a through hole is formed in the center of a disk and the case where no through hole is formed, with the black circles indicating data on disks having through holes of a diameter of 40 mm$\phi$, and the white circles indicating data on disks having no through hole.

In the experiment, sputtering layer-formation was performed under the conditions of: a substrate temperature of 200° C.; a layer-formation speed of 500 nm/min; and an Ar gas pressure of 15 mTorr, so as to form, by sputtering, magnetic layers with a thickness of 50 nm. The actual thickness of the formed layers was measured by a stylus-type level-difference meter. Under the above conditions, a diameter of the through hole is 40 nm$\phi$.

As apparent from FIG. 6, when a through hole is formed in the center of a disk, the layer thickness increases in the vicinity of the central portion. This is because, during the sputtering of particles of the deposition substance onto one surface, a part of the particles escapes through the through hole to the other surface, resulting in the part of the particles being deposited on the reverse surface. In contrast, when no through hole is formed in a disk, substantially no increase in the film thickness occurs because no part of the sputtering particles can escape through the central portion of the disk to the reverse surface. If, in the sputtering, the non-magnetic substrate 11 is set in the holder without any gap therebetween, this makes it impossible for a part of the sputtering particles to escape around the outer peripheral portion of the substrate.

The escape of sputtering particles can take place in various degrees depending on the layer-forming conditions. Therefore, such an escape has, when occurred, made it very difficult to control the thickness of the various layers.

The use of a substrate having no through hole, makes it possible to eliminate the risk that sputtering particles of the substance to be deposited may escape from one surface to the other, hence, to reduce deviations in the layer thickness distribution.

Figure 2:
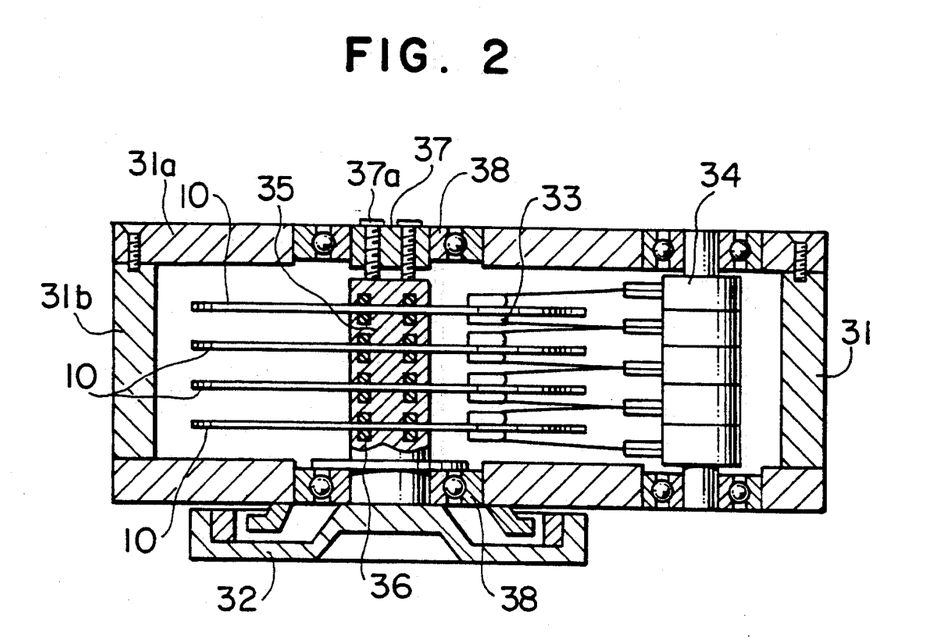
FIG. 2 is a cross-sectional view of a magnetic storage apparatus.
Figure 3:
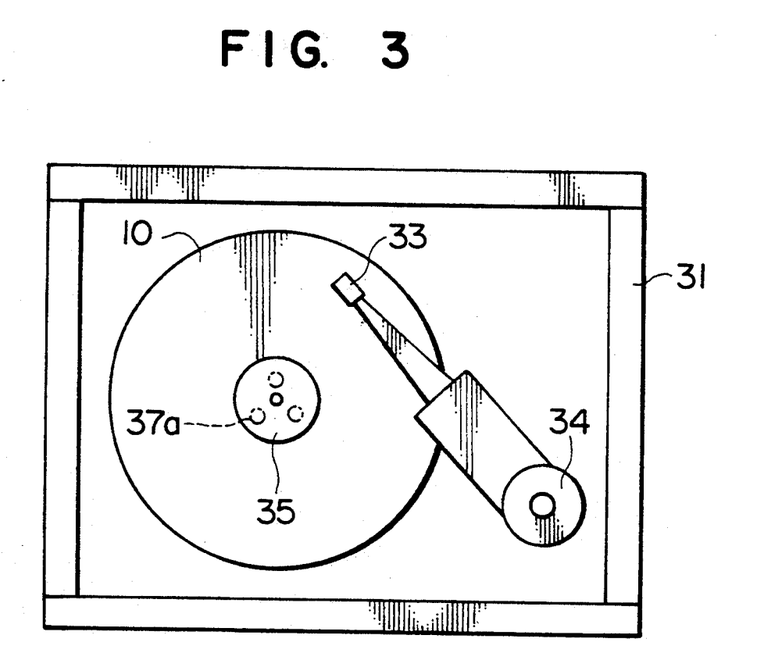
FIG. 3 is a top view of the magnetic storage apparatus.
Figure 5:
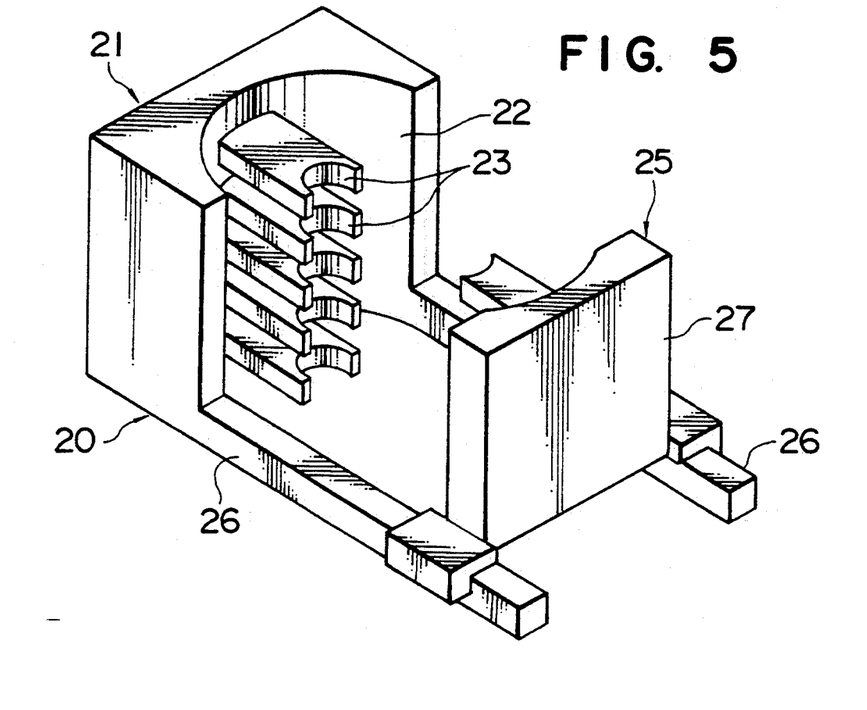
FIG. 5 is a perspective view of a recording media aligning jig.

As shown in FIG. 2, the magnetic storage apparatus includes a chassis 31 on which a drive motor 32 for rotating four magnetic disks 10 and a carriage 34 carrying magnetic heads 33 are mounted. During the assembly of the magnetic storage apparatus, a recording media aligning jig 20, shown in FIG. 5, is positioned on the chassis 31 while a chassis cover 31a and chassis side walls 31b are removed.

The aligning jig 20 basically comprises a reference plate 21 and a pressing mechanism 25. The reference plate 21 is formed with a recording media reference surface 22 which is concave in a circular-arc shape with a radius corresponding to the radius of the magnetic disks 10, and spacer reference surfaces 23 which are concave in a circular-arc shape with a radius corresponding to the radius of spacers 35 (described later) for determining the space between adjacent magnetic disks 10. The recording media reference surface 22 and the spacer reference surfaces 23 are formed with the same axis in the center. The pressing mechanism 25 serves to press the magnetic disks 10 and the spacers 35 in such a manner as to bring the disks 10 and the spacers 35 into contact with the mated reference surfaces 22 and 23. The pressing mechanism 25 comprises a pair of rails 26 fixed to the reference plate 21, and a pressing plate 27 slidably disposed on the rails 26. The pressing plate 27 is, similarly to the case of the reference plate 21, formed with a surface concaved in a circular-arc shape with a radius corresponding to the radius of the magnetic disks 10, and surfaces concaved in a circular-arc shape with a radius corresponding to the radius of the spacers 35.

During assembly, when the aligning jig 20 has been placed on the chassis 31, the spacers 35 and the magnetic disks 10 are sequentially positioned in the space defined by the chassis 31 with the aid of the jig 20. When all the spacers and all the magnetic disks 10 have been positioned inside, the distance between the pressing plate 27 and the reference plate 21 is reduced until the spacers 35 and the magnetic disks 10 contact the mated reference surfaces 23 and 22. This operation causes all of the respective centers of rotation of the spacers 35 and the magnetic disks 10 to coincide with the same straight line that defines the axis of the drive motor 32.

Then, the chassis cover 31a is assembled onto the part of the chassis 31 supporting the disks 10, spacers 35, etc.

A pressing unit 37 is provided on the chassis cover 31a with a rotary shaft bearing 38 disposed therebetween. The pressing unit 37 is provided to press the spacers 35 and the magnetic disks 10 whose respective positions have thus been determined, so as to prevent displacement of these members. The pressing unit 37 has a plurality of bolts 37a, which, when threaded inward under adequate torque, cause the spacers 35 and the magnetic desks 10 to be pressed against one another.

Thereafter, the aligning jig 20 is removed from the sides of the chassis 31, and the chassis side walls 31b are mounted thereon.

Figure 4:
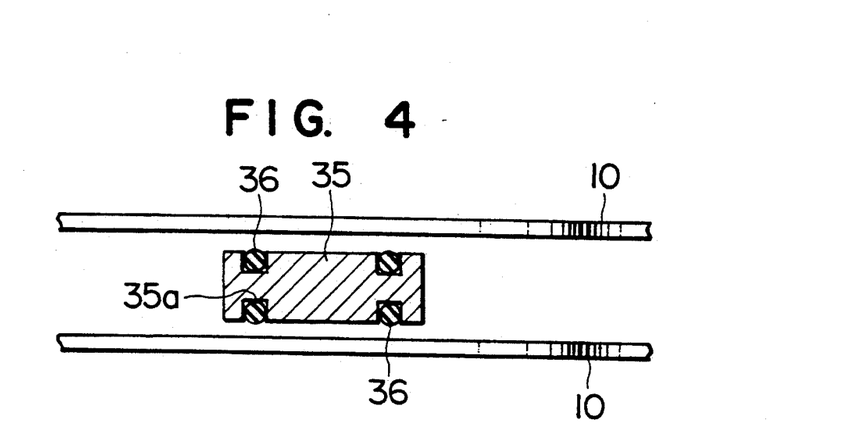
FIG. 4 is a cross-sectional view of some essential parts of the magnetic storage apparatus.

As shown in FIG. 4, each spacer 35 is formed with annular grooves 35a. An O-ring 36, made of a fluororubber, is fitted in each annular groove 35a to serve as a buffer means.

According to this embodiment, since no through hole is formed, there is no possibility of cracks being generated in the inner periphery of a through hole. Accordingly, there is no risk of the magnetic disk being broken due to such cracks, thereby making it possible to improve the strength and reliability of the magnetic disk.

Further, since the strength of the magnetic disk is increased, the thickness of the substrate can be reduced from the conventional dimension of about 2 mm to 1.5 mm.

The absence of a through hole is also advantageous in that the number of the processes necessary to the manufacture of the magnetic disk can be reduced. In addition, the magnetic disk need not be fitted on a spindle, thereby eliminating the risk of the surface of the medium being contaminated by dust generated during the fitting.

Although in this embodiment, the spacers 35 and the magnetic disks 10 are pressed against one another by the pressing unit 37 in order to prevent positional deviation of the spacers 35 and the magnetic disks 10, these members may be fixed together by an adhesive.

The material forming the O-rings 36 may alternatively be a material such as lead or an indium alloy.

Although in this embodiment, the material forming the non-magnetic substrate is a chemically strengthened glass, the material may alternatively be an Si wafer. Since such materials as chemically strengthened glass and Si wafers are materials which are generally hard, there is no need to apply an NiP plating before the base layer is formed in order to assure a certain hardness of the substrate. In addition, such a material makes it possible to increase the level of flatness of the substrate. An Si wafer has a lower degree of contamination than chemically strengthened glass or other materials, and it facilitates the formation of the various layers on the substrate.

It has been confirmed that, if an Si wafer is used as the material forming the non-magnetic substrate, the strength required from a magnetic disk can be assured by a substrate thickness of 0.8 mm when the substrate diameter is 75 mm.

Figure 7:
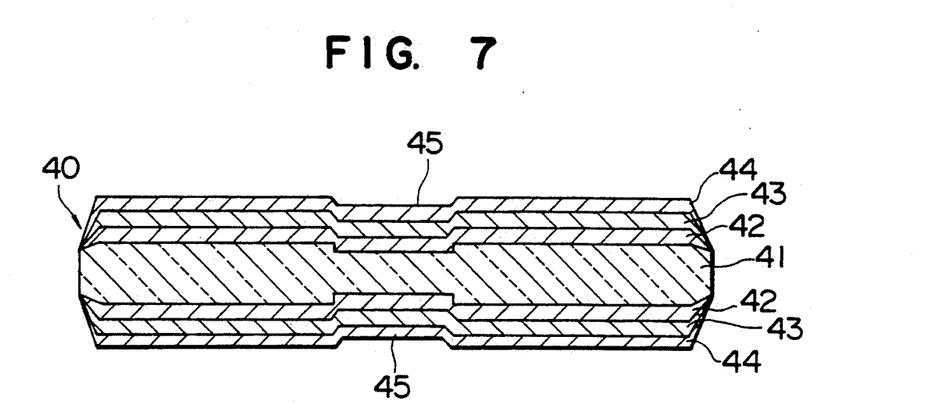
FIG. 7 is a cross-sectional view of a magnetic disk.

As shown in FIG. 7, a magnetic disk 40 according includes a non-magnetic substrate 41 having a recess 45 formed at a central portion of each surface of the substrate, with the recesses 45 constituting a recessed structure. A base layer 42, a magnetic layer 43 and a protective layer 44 are subsequently formed on each surface of the substrate 41. The non-magnetic substrate 41 is obtained by: preparing an Al alloy sheet having an outer diameter of 95 mm, a thickness of 1.2 mm, and recesses 45 with an inner diameter of 20 mm and a depth of 0.15 mm, and forming an NiP plating with a thickness of about 10 μm on the Al alloy sheet.

Figure 8:
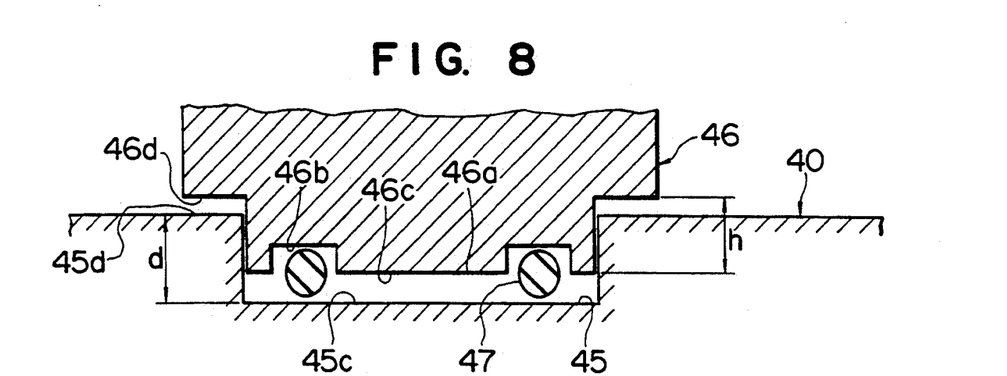
FIG. 8 is a cross-sectional view of some parts of a magnetic storage apparatus.

In order to incorporate such magnetic disks 40 in a storage apparatus, at least one spacer 46, such as that shown in FIG. 8, is used.

The spacer 46 has a protrusion 46a (serving as a part of a protruded structure of the spacer) which is capable of fitting in a recess 45 of one of the magnetic disks 40. The protrusion 46a is formed with an annular groove 46b in which an O-ring 47 is fitted. The height h of the protrusion 46a of the spacer 46 is slightly less than the depth d of the recess 45 of each magnetic disk 40.

The use of the spacer 46 in combination with the magnetic disks 40 makes it possible to cause both the center of rotation of the spacer 46 and the respective centers of rotation of the magnetic disks 40 to correctly coincide with the same straight line without employing a special jig, such as the jig 20 used in the first embodiment. Since the height h of the protrusion 46a of the spacer 46 is slightly less than the depth d of the recess 45 of the magnetic disk 40, when the protrusion 46a of the spacer 46 is fitted in the recess 45 of the magnetic disk 40, the top surface 46c of the protrusion 46a does not contact the bottom surface 45c of the recess 45. At this time, however, a peripheral surface 46d around the protrusion 46a contacts a peripheral surface 45d around the recess 45d, thereby enabling the spacer 46 and the magnetic disk 40 to be maintained in parallel with each other.

Figure 9:
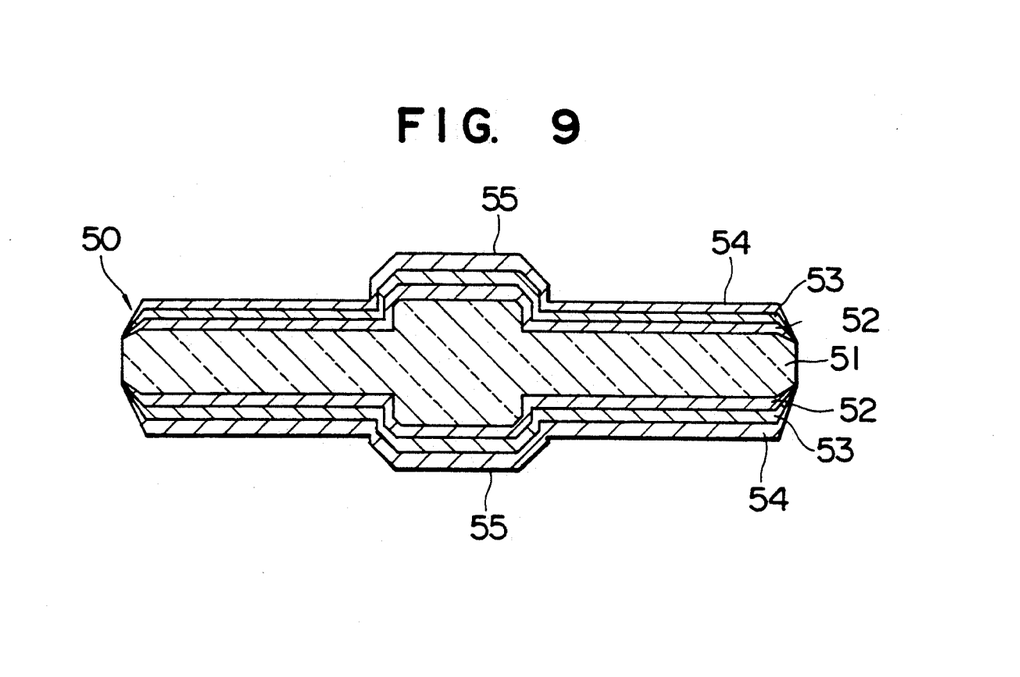
FIG. 9 is a cross-sectional view of a magnetic disk.

In the embodiment of FIG. 9, a magnetic disk 50 provided which is basically the same as the second embodiment, that is, in features such as the size and the material of the substrate, and the construction of the various layers (the substrate and the various layers of the second embodiment are denoted by reference numerals 51 and 52 to 54, respectively), except that a protrusion 55 is formed at a central portion on each side of the disk 50 (the protrusions constituting a protruded structure).

Figure 10:
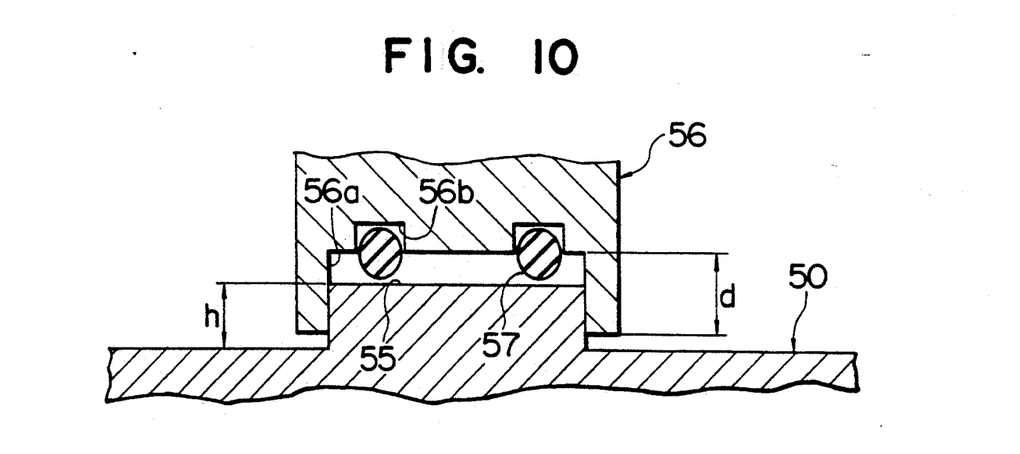
FIG. 10 is a cross-sectional view of some parts of a magnetic storage apparatus.

At least one spacer 56 to be combined with such magnetic disks 50 has a recess 56a (serving as a part of a recessed structure of the spacer) which is capable of fitting with a protrusion 55 of one of the magnetic disks 50. The recess 56a is formed with an annular groove 56b in which an O-ring 57 is fitted. The depth d of the recess 56a of the spacer 56 is slightly less than the height h of the protrusion 55 of each magnetic disk 50.

This embodiment provides advantageous effects which are basically the same as those of the second embodiment. However, the third embodiment is superior to the second embodiment with regard to strength.

Although in each of the second and third embodiments, a recess or protrusion is formed on each side of a magnetic disk at the center of rotation thereof, a plurality of recesses or protrusions may be formed on each side at positions equidistant from the center of rotation of the disk. With this construction, although the number of the disk-manufacturing processes increases, it is possible to prevent displacement of the magnetic disks and the spacers in the direction of rotation.

Although in each of the second and third embodiments, recesses or protrusions are formed in or on either surface of the substrate, a different construction may be adopted, in which a recess is formed in one of the surfaces, and a protrusion is formed on the other.

Although in each of the second and third embodiments, recesses or protrusions are formed in or on the substrate per se, a different construction may be adopted, in which, in order to maintain the strength of the substrate, the substrate is formed with both of its surfaces being flat, and in which the recessed and/or protruded structure(s) are formed in or on various films on the substrate. Since the formation of the films inevitably limits the depth of the recesses and the height of the protrusions, it is necessary to provide a plurality of recesses or protrusions on each side (as described above) in order to prevent displacement of the disks and the spacers.

Although the foregoing embodiments all concern magnetic disks, the present invention is not intended to be limited thereto, and may be applied to any disk-type recording media such as optical disks or magnetic-optic disks.

Although not directly connected with the present invention, it has been confirmed by various tests that the application of a lubricant on the protective layers improves the sliding resistance of the recording media.

According to the present invention, no through hole is formed in a disk-type recording medium, thereby making it possible to improve the strength and reliability, and to reduce the thickness of the substrate.

The absence of a through hole is also advantageous in that it is possible to prevent any of the substance from being deposited on one surface from escaping through the through hole to the other surface, thereby ensuring formed layers of a uniform thickness.

What is claimed is:

1. A storage apparatus comprising:

a plurality of disk-shaped recording media each having a circular substrate on which a recording layer is formed, said circular substrate having no through hole formed therein;

at least one spacer for maintaining the space between adjacent ones of said plurality of disk-shaped recording media;

pressing means for pressing a recording media assembly of said plurality of disk-shaped recording media stacked one above another through said at least one spacer, said pressing means pressing in such a manner that the respective axes of rotation of said plurality of disk-shaped recording media each coincide with the same straight line so that relative displacement of the plurality of disk-shaped recording media is prevented;

driving means for driving and rotating said recording media about said axes of rotation; and head means for recording data on and/or reproducing data from said disk-shaped recording media.

2. A storage apparatus according to claim 1, wherein each of said plurality of disk-shaped recording media has at least one of a protruded or recessed structure formed at or in a vicinity of the axis of rotation of the medium, and wherein said at least one spacer has at least one of a protruded or recessed structure capable of fitting with said at least one recessed or protruded structure of said disk-shaped recording medium, said recording media assembly comprising said plurality of disk-shaped recording media stacked one above another together with said at least one spacer with at least one of said protruded or recessed structure of said at least one spacer fitting with said at least one of the recessed or protruded structure of said disk-type recording medium.

3. A storage apparatus according to claim 1 or 2, further comprising a buffer means between a disk-shaped recording medium and a spacer.

4. A disk-type recording medium according to claim 1, wherein said recording layer is made of a magnetic material.

5. A disk-type recording medium according to claim 1, wherein said circular substrate is made of a ceramic material.

6. A disk-type recording medium according to claim 1, wherein said circular substrate is composed of a Si wafer.

7. A recording media aligning jig for aligning a plurality of disk-shaped recording media having the same diameter and having no through hole at the position of the axis of rotation of each medium, said jig aligning said media in such a manner that the respective axes of rotation of said plurality of disk-shaped media each coincide with the same straight line, said jig comprising:

a recording media reference body having a first reference surface formed linearly in a direction parallel to the axis of rotation of said plurality of disk-shaped recording media, said first reference surface being capable of contacting the individual outer peripheral edges of said plurality of disk-shaped recording media;

a spacer reference body having at least one second reference surface formed linearly in a direction parallel to the axis of rotation of at least one spacer for maintaining the space between adjacent ones of said plurality of disk-shaped recording media, said at least one second reference surface being capable of contacting the outer peripheral edge of said at least one spacer; and a pressing mechanism for pressing said plurality of disk-shaped recording media and said at least one spacer in such a manner as to bring said media and said at least one spacer into contact with the mated reference surfaces.

* * * * *